United States Patent [19]

Post

[11] 4,332,435
[45] Jun. 1, 1982

[54] GLASS FIBRE CABLE JUNCTION BOX

[75] Inventor: Jan Post, Nieuwegein, Netherlands

[73] Assignee: N.K.F. Groep B.V., Netherlands

[21] Appl. No.: 103,656

[22] Filed: Dec. 14, 1979

[30] Foreign Application Priority Data

Jan. 19, 1979 [NL] Netherlands ............... 7900432

[51] Int. Cl.$^3$ .............................................. G02B 7/26
[52] U.S. Cl. ................... 350/96.20; 350/96.22
[58] Field of Search ............... 350/96.20, 96.21, 96.22, 350/96.15; 248/544; 211/26, 49 R, 71

[56] References Cited

U.S. PATENT DOCUMENTS

| | | | |
|---|---|---|---|
| 3,455,625 | 7/1969 | Brumley et al. | 350/96.22 |
| 4,171,867 | 10/1979 | Cocito | 350/96.21 |
| 4,266,853 | 5/1981 | Hutchins et al. | 350/96.20 |

FOREIGN PATENT DOCUMENTS

| | | | |
|---|---|---|---|
| 2621852 | 11/1977 | Fed. Rep. of Germany | |
| 2651080 | 5/1978 | Fed. Rep. of Germany | 350/96.15 |
| 2363243 | 3/1978 | France | 350/96.21 |
| 52-29235 | 3/1977 | Japan | 350/96.15 |
| 1488409 | 10/1977 | United Kingdom | 350/96.20 |

OTHER PUBLICATIONS

Schilb et al., "Compensating Fiber Splice Technique", Electronics Letters, vol. 13, No. 9, Apr. 1977, pp. 257-258.

Hatakeyama et al., "Fusion Splices for Single-Mode Optical Fibers", IEEE J.Q.E., vol. QE-14, No. 8, Aug. 1978, pp. 614-619.

Primary Examiner—John D. Lee
Attorney, Agent, or Firm—Marc D. Schechter

[57] ABSTRACT

Junction box for a cable comprising optical fibers, consisting of elongate flat holders wherein a splice and the remaining fiber lengths of a pair of fiber ends are stored in each holder. Two elongate plates clamp the holders therebetween. Two end plates are fitted to the end faces of the elongate plates. A housing surrounds the holders and the elongate plates. Each end plate is provided with a feedthrough opening and a pull relief for the optical cable. Each holder has two storage spaces, one for each of the remaining fiber lengths, which are interconnected, via an opening to a sidewall, through a recess. The splice is stored in the recess. Two connecting bolts, which keep the two elongate plates and the holder assembly together and which have a diameter larger than or equal to twice the minimum radius of curvature of the fibers to be coupled, pass through the storage spaces.

4 Claims, 3 Drawing Figures

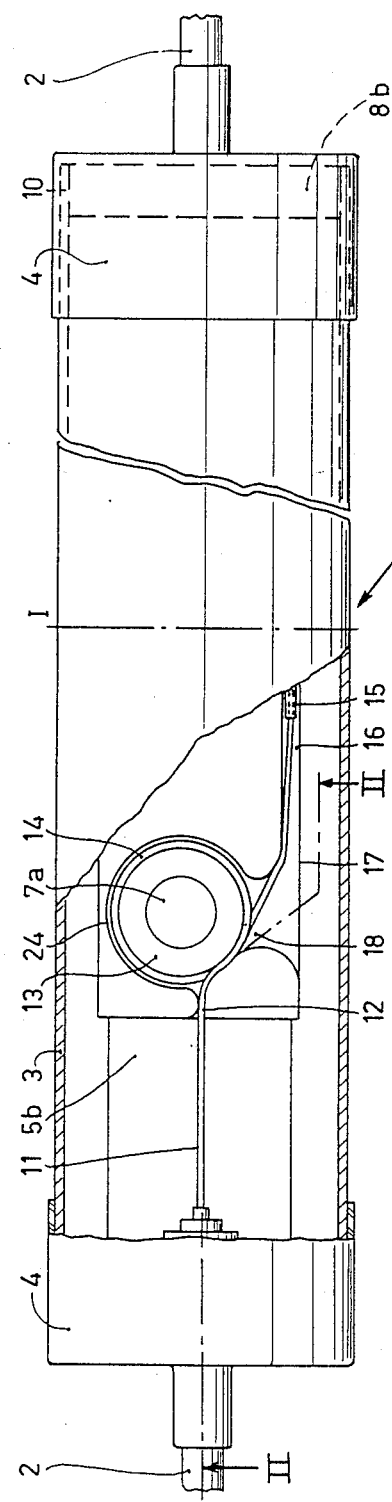
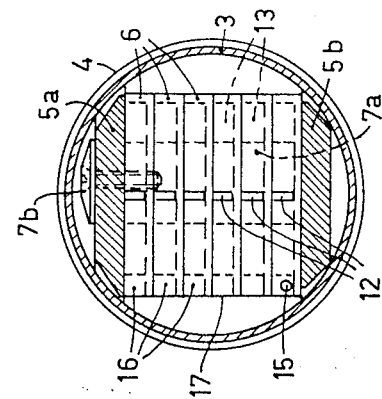
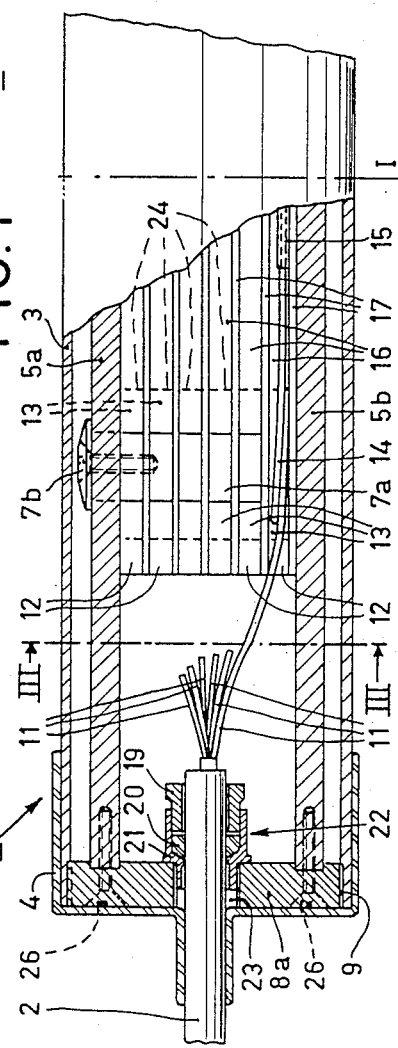

GLASS FIBRE CABLE JUNCTION BOX

BACKGROUND OF THE INVENTION

The invention relates to a junction box for connecting the ends of two optical cables, each cable comprising at least one fiber for transmitting light signals. The junction box comprises means for storing spare fiber lengths and a guide for accommodating each splice of the ends of two fibers.

A junction box of the type described above is disclosed in German Offenlegungsschrift No. 26.21.852 and is used in optical (tele)communication systems in which information is transmitted by sending light pulses through optical fibers. The box shown in Offenlegungsschrift No. 26.21.852 has two storage spaces limited by three conducting pins, a conducting comb being placed between these spaces for accommodating the spliced optical fiber ends. The spare length of optical fibers present between the splice in the fiber and the ends of the cable are stored in the storage space between the conducting pins.

A drawback is, however, that if the cables contain several optical fibers, all spare lengths must be stored in one and the same storage space. This appears to have the considerable drawback that when making a splice between fiber ends, for example during repair operations or changes in the optical (tele)communication system, the required fiber end must be searched for and found from among all the other ends.

SUMMARY OF THE INVENTION

It is an object of the invention to provide a junction box in which the ends of the optical fibers are not indistinguishably mixed together.

The invention is characterized in that the box comprises, for each pair of optical fiber ends to be coupled, an elongate, flat, stackable holder, which is provided with a recess to accommodate a splice of fiber ends. On either side of the recess, the holder comprises a storage space for accommodating the spare length of each fiber associated with the splice.

Such a junction box has the advantage that when making or repairing a connection, each splice and each spare length are individually accessible and distinguishable. This enables a more efficient use of the box, as, for example, in the case of a fracture, the loose ends which move into the spare length storage space owing to the internal tension in the material need not be hunted for between the other spare lengths.

A preferred embodiment of a junction box according to the invention is characterized in that each storage space has an opening through which each spare length, in a parcel of stacked holders, is accessible. The recess for the splice extends into one side of the holder, from opening to opening.

Such a box has the advantage that when repair is necessary, the entire parcel need not be disassembled before the relevant ends can be taken from the storage space. This results in a considerable saving in time.

BRIEF DESCRIPTION OF THE DRAWING

The junction box according to the invention will be further explained with reference to the drawing.

FIG. 1 shows a partially cut-away top view of a junction box according to the invention.

FIG. 2 shows a partially cut-away elevational view of the box of FIG. 1.

FIG. 3 shows a cross-section through the box shown in FIG. 2.

DESCRIPTION OF THE PREFERRED EMBODIMENTS

FIG. 1 shows a partially cut-away top view of a junction box 1 according to the invention. Optical cables 2 are connected to the ends of box 1. The connections are sealed with a water-tight envelope 4, at either end of the box. Envelope 4 may consist of a length of shrink-on sleeve. In the cylindrical housing 3, holders 6 are fixed by means of two bolts 7a and 7b (FIGS. 2 and 3) between two elongate plates 5a and 5b. The elongate plates 5a and 5b are fixed by means of bolts 26 between end plates 8a and 8b (see also FIG. 2). On one side of the housing 3, end plate 8a is attached by means of a screwthread connection 9 (see FIG. 2); on the other side of the housing 3, end plate 8b is attached by means of a sliding fit 10. The optical cable 2 is separated in the box 1 into individual optical fibers 11, which are consecutively fed, via a lead-in opening 12, into individual storage spaces 13 formed in the holders 6. In storage spaces 13, the fibers 11 are wound around the bolts 7a and 7b respectively. The lengths 14 of the optical fibers 11, which were passed into the storage spaces 13 are denoted spare lengths.

In addition, the holders 6 are each provided with a guide for accommodating a splice 15 between the ends of the two optical fibers 11. This guide consists of a recess 16 which is formed in a sidewall 17 of the holder 6 and interconnects openings 18 between the storage spaces 13 and the sidewall 17. (The holder 6 and the box 1 are each symmetrical with respect to the line I—I, except for the screwthread connection 9 and sliding fit 10.)

FIG. 2 shows a partially cut-away (along the line II—II in FIG. 1) elevational view of a junction box 1 according to the invention. The optical cables 2 are fed via a feed-through opening 23 through the end plates 8a and 8b (visible at end plate 8a only). At this point, end plates 8a and 8b are fixed to elongate plate 5b only. The cable 2 is clamped in a feed-through bush 21 by means of a union 19 and a gasket 20 and constitutes a pull relief 22. After connecting the cables 2, the bolts 7a are screwed into the elongate plate 5b, whereafter a holder 6 is placed on the elongate plate 5b. The cables 2 are separated into individual optical fibers 11, one fiber 11 of which is wound a number of times around each bolt 7a (8 to 10 times), on either side of the holder 6 in the storage space 13. When the fiber end is released, the wound fiber 14 (the spare length) will try to unwind itself owing to the internal tensions in the material produced by the winding operations, so that the spare length 14 is pushed against the edge 24 of the storage space 13. Now the spare length still is wound 4 to 6 turns.

The next holder 6 is now put into position, so that the spare lengths 14, stored in the storage spaces 13 of the first-mentioned holder 6 are enclosed and are only accessible through the opening 18. The spare lengths of a next fiber 11 are stored in the storage spaces 13 of the second holder 6, whereafter a third holder 6 is put into position, and so on.

After the last fiber 11 has been stored, elongate plate 5a is fitted to the holders 6 and between the end plates 8a and 8b by means of the bolts 7b and 26. The spare lengths 14 are now enclosed in the storage spaces 13 and are protected from damage. A spare length 14 can be pulled from a storage space 13 through the opening 18, causing the diameter of the turns in the storage space 13 to become smaller (not less than the diameter of the bolt connection). A maximum length equal to $n \cdot \pi \cdot (D-d)$ can be pulled from the storage space 13, wherein n is the number of turns, D the diameter of the storage space 13 and d the diameter of the bolt 7a. As a result, a length of ½ meter can be pulled rather easily from the storage space 13. This length is amply sufficient to make, outside the junction box 1, a splice (between two spare lengths 14 stored in a holder 6) as described in, for example, Electronics Letters, Apr. 28, 1977, Volume 13, No. 9, pages 257 and 258 (cemented splice) or in IEEE Journal of Quantum Electronics, Volume QE-14, No. 8, August 1978, pages 614–619 (butt weld by means of a fusion splicing apparatus).

After a splice 15 has been made a protective sleeve is disposed around it (for example a shrink-on sleeve). The fiber length pulled from the storage space 13 is withdrawn by the mechanical tension in the turns in the storage space 13, as the turns tend to unwind. So the splice 15 is pulled into the recess 16 and retained there. After all splices have been made (for example six in FIG. 2), housing 3 is pushed around the holders 6 by means of the sliding fit 10, and it is then screwed to the end plate 8a. Finally, the watertight envelopes 4 are applied to seal the connections.

FIG. 3 shows a cross-section along the line III—III through the junction box 1 to explain its construction. The lead-in openings 12 in the holders 6, the recesses 16 for the splices 15 (one of which is shown only), the storage spaces 13, the elongate plates 5a and 5b, bolts 7a and 7b, housing 3, and a watertight envelope 4 are distinctly shown.

Furthermore, it will be clear that the holder assembly 6 is not under mechanical stress, as this assembly is enclosed in a frame formed by the elongate plates 5a, 5b and the end plates 8a, 8b. Consequently, the holders 6, which need not satisfy high constructional requirements, may, for example, be made of easily machinable synthetic resin material. Neither is it necessary for the holders 6, as shown, to be solid, but they might consist of a thin, flat plate which is provided with bosses which define a lead-in opening 12, a storage space 13 and a recess. These bosses should therefore be disposed as follows: to the left and to the right of lead-in opening 12 and opening 18, along the edge 24 of the storage space 13 and along the recess 16.

What is claimed is:

1. A junction box for connecting the ends of two optical cables, each cable comprising at least one optical fiber for conducting light signals, said junction box having space for storing spare lengths of optical fiber and having a guide for accommodating a splice of the ends of two optical fibers, characterized in that the junction box comprises an assembly of stacked, elongate, flat holders, one holder for the ends of each pair of optical fibers to be coupled, said holders each comprising:
   a recess for accommodating a splice between the fibers to be coupled; and
   two storage spaces, one on either side of the recess, each space for loosely accommodating a spare length of an optical fiber, said storage spaces each having an inner diameter at least equal to twice the minimum radius of curvature of the optical fibers to be spliced.

2. A junction box as claimed in claim 1, characterized in that each storage space is provided with an opening, each recess is provided in a side wall of a holder and extends between the openings in the storage spaces, and in the assembly of stacked holders, all of the openings and all of the recesses are accessible without disassembling the stacked holders.

3. A junction box as claimed in claim 2, characterized in that the stacked holders are fastened together into an assembly by two bolts, each bolt passing through a stack of storage spaces, said bolts each having a diameter at least equal to twice the minimum radius of curvature of the optical fibers to be spliced.

4. A junction box as claimed in claim 3, characterized in that the box further comprises:
   two parallel, elongate plates, each plate having two ends, the stacked holders being bolted between said plates;
   two circular end plates attached to the ends of the two elongate plates, transverse thereto; and
   a cylindrical housing having two ends closed by the end plates.

* * * * *